United States Patent [19]

Kammler et al.

[11] Patent Number: 4,750,313

[45] Date of Patent: Jun. 14, 1988

[54] PACKAGING MACHINE FOR THE MANUFACTURE, FILLING AND CLOSING OF BAGS AND A METHOD FOR OPERATING SUCH A MACHINE

[75] Inventors: Ing. R. Kammler, Wallstrasse; Reiner Ade, Ritterhausstr; Walter Baur, Herzbergstr, all of Fed. Rep. of Germany

[73] Assignee: Rovema Verpackungsmaschinen GmbH, Fernwald-Annerod, Fed. Rep. of Germany

[21] Appl. No.: 943,974

[22] Filed: Dec. 19, 1986

[30] Foreign Application Priority Data

Dec. 20, 1985 [DE] Fed. Rep. of Germany ....... 3545228
Apr. 25, 1986 [EP] European Pat. Off. ........... 86105780

[51] Int. Cl.⁴ .......................... B65B 9/20; B65B 9/12
[52] U.S. Cl. ........................................ 53/451; 53/552
[58] Field of Search ................... 53/451, 51, 551, 552, 53/373, 389

[56] References Cited

U.S. PATENT DOCUMENTS

| | | | |
|---|---|---|---|
| 3,522,689 | 8/1970 | Wylie et al. | 53/552 |
| 3,629,987 | 12/1971 | Klopfenstein et al. | 53/51 X |
| 4,023,327 | 5/1977 | Simmons | 53/552 X |
| 4,128,985 | 12/1978 | Simmons | 53/51 |
| 4,199,919 | 4/1980 | Moscatelli | 53/552 |
| 4,288,965 | 9/1981 | James | 53/551 X |
| 4,516,379 | 5/1985 | Iain | 53/552 X |
| 4,532,753 | 8/1985 | Kovacs | 53/373 X |
| 4,546,596 | 10/1985 | Cherney | 53/551 X |

*Primary Examiner*—Horace M. Culver
*Attorney, Agent, or Firm*—Flynn, Thiel, Boutell & Tanis

[57] ABSTRACT

A packaging machine for manufacturing filling and closing of bags. A foil tube (4) is pulled off continuously by means of unwinding belts (13) on a packaging machine contracted as a tubular bag-forming machine. Cross sealing seams are created by means of continuously moving cross sealing jaws. The cross sealing jaws are maintained in a horizontal position during their entire movement by being guided in guide grooves. The guide curves have straight curve pieces in the area of a sealing zone, which curve pieces extend parallel with respect to the unwinding direction of the foil tube (4). The packaging machine permits a high operating speed, since the cross sealing occurs simultaneously with the unwinding movement and the cross sealing jaws, are guided exactly in an optimum position with respect to the foil tube. (4). The machine can be operated such that the unwinding speed for the thin sheet material is only a little slower than the speed of the goods to be packaged at the end of the fill pipe.

22 Claims, 6 Drawing Sheets

4,750,313

PACKAGING MACHINE FOR THE MANUFACTURE, FILLING AND CLOSING OF BAGS AND A METHOD FOR OPERATING SUCH A MACHINE

FIELD OF THE INVENTION

The invention relates to a packaging machine for the manufacture of bags out of a thin sheet material foil made of a hot-sealable material and for filling and closing the bags, comprising a preferably vertically extending fill pipe which is surrounded by a forming shoulder, at which said thin sheet material foil can be formed into a tube, a longitudinal sealing member for connecting the overlapping edges of the thin sheet material foil and a cross sealing station arranged behind the output end of the fill pipe and has ring cross sealing jaws, which are arranged on two sealing jaw carriers which are synchronously movable and in opposite directions about parallel axes, whereby each cross sealing jaw is held by a jaw holder swingable relative to the associated sealing jaw carrier.

BACKGROUND OF THE INVENTION

Packaging machines of this type have the advantage that the cross sealing, with which a filled bag is closed off and with which the bottom seam is created for the next bag, occurs during the unwinding movement of the foil tube, so that the time needed for unwinding can be utilized for the sealing task. The time of manufacture can thus be reduced per bag in comparison with those packaging machines where the cross sealing occurs during the time that the foil tube is stationary.

In a known packaging machine of the mentioned type (German AS No. 21 26 498), the foil tube is advanced by the welding jaws and the unwinding movement is not continuous, since a certain time interval passes following the release of the cross sealing jaws from the tube which have produced the cross sealing seams and the engagement of the next following cross sealing jaws. The star-shaped sealing jaw carriers are in the known packaging machine supported on swingable arms. By swinging the arms, the cross sealing jaws approach the foil tube and clamp it. Upon a further rotation of the sealing jaw carriers, the thin sheet material tube is unwound. It is necessary for this downward movement that the two axes of the sealing jaw carriers are moved relative to one another. The sealing jaw carriers and the sealing jaws arranged thereon are necessarily heavy, so that substantial forces due to inertia are created, which limits the operating speed. Also the intermittent unwinding of the thin sheet material tube influences the operating speed.

In a further known packaging machine (U.S. Pat. No. 3,522,689), which is constructed similarly to the aforedescribed machine according to German AS No. 21 26 498, a total of six sealing jaws are arranged on each sealing jaw carrier, so that a sealing jaw pair can engage the thin sheet material foil before the preceding sealing jaws have freed the foil tube. This results in a continuous unwinding of the foil, however, the bag length cannot be changed, if the continuous unwinding is to be maintained. If the bag length would be doubled by using only three the six jaws of each sealing jaw carrier, then a continuous unwinding would no longer be possible.

Cross sealing jaws rotate about stationary axes in a further known packaging machine (German Pat. No. 31 41 431). Friction segments, with which the foil tube is unwound and which are fixedly connected to the holders for the cross sealing jaws, rotate also about the same axes. A space for filling in the fill material is provided between the leading friction segments and the following cross sealing jaws. The very short welding time is disadvantageous in this packaging machine. Also the characteristic of movement of the cross sealing jaws is such that these first rest only with edges on the thin sheet material foil. The short welding time limits the use of the known machine to a few thin sheet materials of a specific composition. Due to the initial, only linelike contact between the cross sealing jaws and the thin sheet material tube, there exists the danger that the thin sheet material is overheated. A wedge, into which fill material can fall, exists during the closing movement of the cross sealing jaws between the welding surfaces of the two cross sealing jaws, so that the sealing is enhanced. A problem is in this known machine also the arrangement of knives for cutting off the finished bags. The bag sizes can be varied only within narrow limits.

Finally, a packaging machine for packaging of individual pieces is also known in which the foil tube is moved horizontally (German Pat. No. 27 01 443). Welding and cutting jaws are moved on circular tracks in a welding and cutting station. The jaws are shifted only parallel to themselves on the circular tracks, so that their welding surfaces always face the foil tube. This is achieved with the help of carriages, which can be moved perpendicularly to one another and of which one cooperates with an eccentric. The parallel movement of the jaws achieves an advantageous contacting of the jaws on the foil tube, however, only relatively short welding times can be realized at a given speed of movement of the foil tube.

The basic purpose of the invention is to provide a packaging machine of the abovementioned type, as it is known from German AS No. 21 26 498 and U.S. Pat. No. 3,522,689 such that a continuous movement of the thin sheet material is possible and the bag lengths can be chosen as desired. Furthermore, the invention provides a method which with the inventive machine can achieve a particularly high performance.

The first part of the purpose of the invention is attained by providing movable thin sheet material conveyors for unwinding the thin sheet material foil continuously. The conveyors are in the form of unwinding rollers or unwinding belts, which in the area below the forming shoulder rest with frictional resistance on the thin sheet material, and by the relationship between the peripheral speed of the thin sheet material conveyors and the sealing jaw carriers being adjustable, whereby the speed of movement of the sealing jaws during their contact with the foil tube is approximately the same or is less than the peripheral speed of the thin sheet material conveyors.

The unwinding in a so constructed packaging machine does not occur, as this is the case in the known machines, with the sealing jaws (socalled unwinding by tongs), but by means of special thin sheet material conveyors, as they are known in tubular bag packaging machines. By separating the thin sheet material transport and cross sealing, a continuous thin sheet material unwinding can also be maintained when the bag lengths are varied, since it is not necessary like in the known machine according to U.S. Pat. No. 3,522,689 that two cross sealing jaw pairs simultaneously engage the foil tube. Different bag lengths can also be manufactured when the sealing jaw carriers move with an approximately constant angular speed. A bulging out of the lower end of the foil tube occurs then during the manufacture of longer bags. However, it is also possible and technically nonproblematic to substantially vary the angular speed during the movement of the sealing jaw carriers. The peripheral speed of the sealing jaw carriers is then during the manufacture of relatively long bags chosen relatively low in a phase between two cross sealings. When manufacturing relatively short bags, the peripheral speed of the sealing jaw carriers is chosen relatively high between two cross sealings. This avoids an excessive bulging out of the tube end. A small bulging, however, is advantageous for the filling of the bag.

A preferred embodiment of the invention is characterized by the mentioned axes being arranged stationarily, by the sealing jaw holders being radially movable in the sealing jaw carriers and by each sealing jaw holder having two guide elements, each of which being guided on a guideway of a guideway pair, whereby the guideways are closed within themselves and both guideways have the same shape, however, are moved parallel to one another and the cross sealing, at least in the area of the sealing zone in which the cross sealing jaws extend rectilinarly in unwinding direction of the thin sheet material tube, are oriented perpendicularly with respect to the thin sheet material tube.

In a so constructed packaging machine there occur even at a high operating speed only relatively small forces due to inertia, since not all sealing jaw carriers are moved discontinuously, but only the jaw holders carry out relatively small movements relative to the sealing jaw carriers. The special design of the jaw holders assures that the cross sealing jaws come into contact from the start with their entire heating surfaces with the thin sheet material. Burning of the thin sheet material is safely avoided in this manner. The sealing time can extend approximately over a full operating cycle, so that also at a high cycle number a long sealing time is available and in this manner practically all common thin sheet materials can be processed.

A third guideway is advantageously provided which is concentric to one of the mentioned guideways, whereby one of the guideways, which are concentric to one another, is arranged so that one is located on each side of the sealing jaw holders. This results in a strong rigidity of the arrangement even if the sealing jaws are constructed relatively long.

Each sealing jaw carrier has advantageously a shaft and two guide parts. The jaw holders can be suspended particularly advantageously therewith. Advantageous is also the separation of the guideways for the radial movement of the jaw holders and for their rotation. Large guide surfaces for the radial guiding can thus be created.

The construction of the guideways as grooves is advantageous, since in this manner a forced guiding is achieved. However, in principle it is also possible to press the guide elements through spring forces on a guideway.

The jaw holders can be guided particularly advantageously if one guideway is arranged on one side and another guideway on the other side of the sealing jaw carrier. When three guideways are provided, it is particularly advantageous to arrange these concentric guideways so that they cooperate with guide rollers which are both concentric to the swivel axis of the jaw holder. The jaw holder is, in this manner, held particularly advantageously.

The shape of the guideways can be calculated particularly easily if one guide element is concentric to the swivel axis of the associated jaw holder. The shape of the guideways can then be chosen for example advantageously.

One single sealing jaw is principally sufficient for each sealing jaw carrier. Particularly advantageous, however, is the arrangement of two cross sealing jaws on one sealing jaw carrier. Also more than two cross sealing jaws can be provided on one sealing jaw carrier.

The sealing jaw carriers are, according to a further development, supported resiliently flexibly relative to one another. A specific pressure of the cross sealing jaws against one another can be adjusted by the resilient flexibility, which results in a good adjustment to the respective structure of the thin sheet material.

Because of the long contact time of the sealing jaws with the thin sheet material, the arrangement of a knife in the sealing jaws is possible also without any problems. To return the knife, a return spring is provided.

In order to further increase the operating speed, air nozzles for cooling air for cooling off the sealing seam are provided, according to a further development of the invention, on each cross sealing jaw. With this the seam can be cooled off quickly and thus the seam solidifies quickly. The air supply to the nozzles occurs advantageously by an even air distribution system, with which means, aside from the aforesaid even air distribution system, the rate of air flow can be determined.

It is possible in principle that the rotary speed of the shafts of the sealing jaw carriers and the unwinding speed of the foil tube are constant and are at a specific relationship to one another. The relatively small speed variations, which the cross sealing jaws experience in this case in the area of the sealing station, can easily be absorbed by the tube, especially since same is bulged out by the fill material. However, it is also possible to make speed adjustments which can be advantageous particularly during the manufacture of large bags.

The second part of the purpose of the invention is attained by the thin sheet material foil being unwound with a speed which is only little less than the speed of movement (speed of the material) of the material to be packaged relative to the lower end of the fill pipe.

The highest possible performance of the machine is achieved by approximating the unwinding speed for the thin sheet material with the falling speed of the material to be packaged. The material to be packaged is protected in the best possible manner, since a hitting of the material on the bottom of the bag is avoided. This also has the advantage that the bottom seam of the bag to be filled is not stressed, so that a filling is possible prior to the seam of the bag becoming rigid due to cooling off. This substantially contributes to achieving a high operating speed. One can also imagine the inventive method such that packaging portions are enclosed in the bag during their fall. A stress of the bag during filling does not at all take place any longer at an approximation, which is as close as possible to the ideal condition. However, to avoid as much as possible that filler is welded into the cross seams, it is advantageous to maintain a certain difference between material speed and unwinding speed.

BRIEF DESCRIPTION OF THE DRAWINGS

One exemplary embodiment of the invention is illustrated in the drawings, in which.

DETAILED DESCRIPTION

Figure 1:
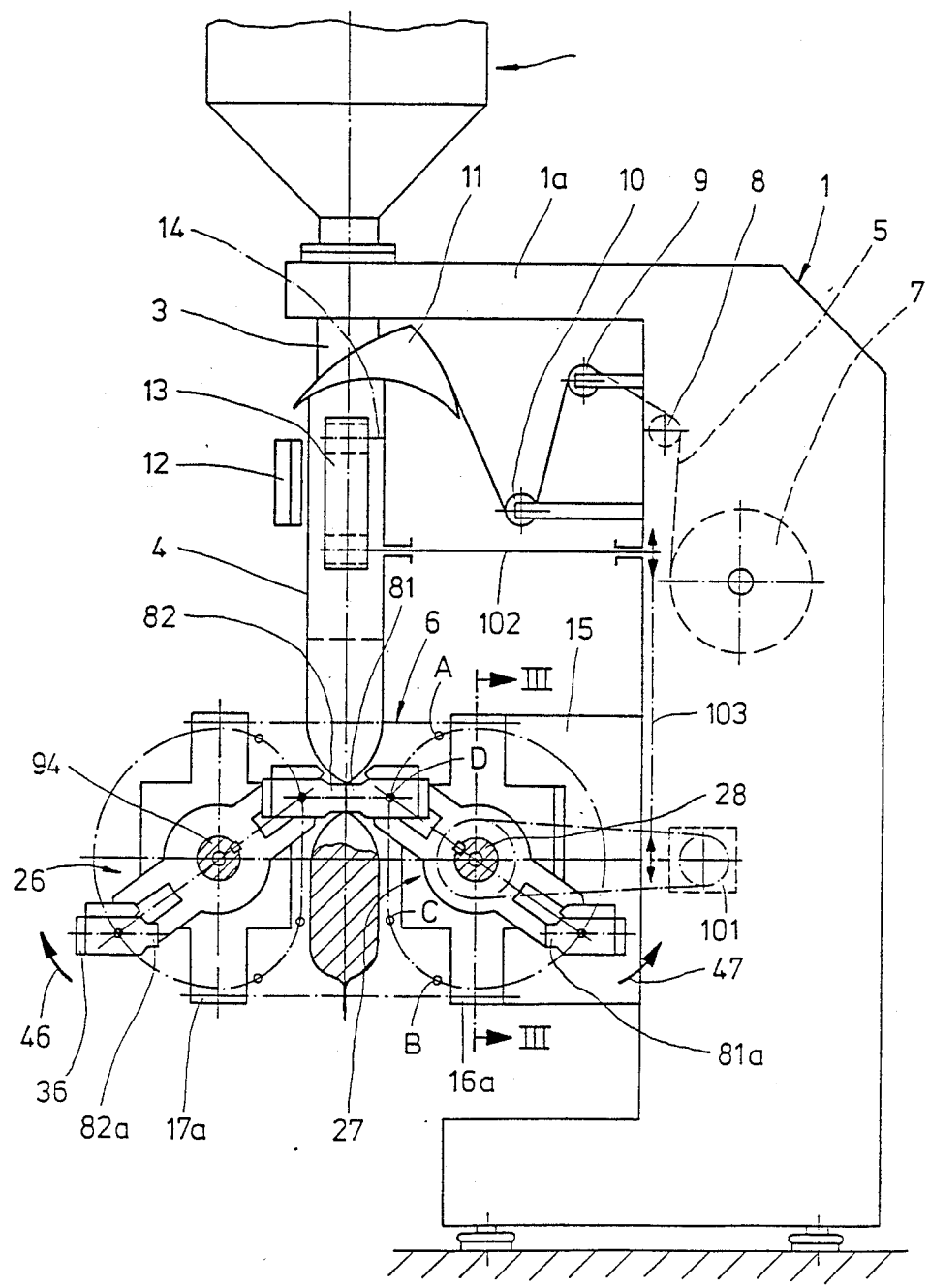
FIG. 1 is a schematic side view of a packaging machine.

The packaging machine has a frame 1, on which all functional parts of the machine are secured. A dosing device 2 is secured to an upper projection 1a of the frame 1. The dosing device 2 discharges the portions which are to be packaged.

The portions are moved into a fill pipe 3 and fall into a bag formed out of a tube 4. The tube 4 is formed out of a thin sheet material foil 5. Bags are separated at a cross sealing station identified by the reference numeral 6.

The thin sheet material foil 5 is stored on a roller 7 and is guided to a forming shoulder 11 over diverse guide rollers 8, 9, and 10. The foil 5 is formed into a tube with overlapping edges at the forming shoulder 11. A longitudinal sealing jaw 12 is used to weld the overlapping edges together. The jaw 12 rests preferably continuously on the thin sheet material, thus forming a type of a slider. Two unwinding belts 13 are used for the continuously occurring unwinding of the thin sheet material foil along the fill pipe 3. The unwinding belts 13 rest diametrically opposed to one another on the thin sheet material foil and carry same along by friction. The unwinding belts 13 are driven by a shaft symbolized by a dash-dotted line 14.

The design of the packaging machine described up to now is known. What is new is the cross sealing station 6, which will be described hereinafter.

Figure 2:
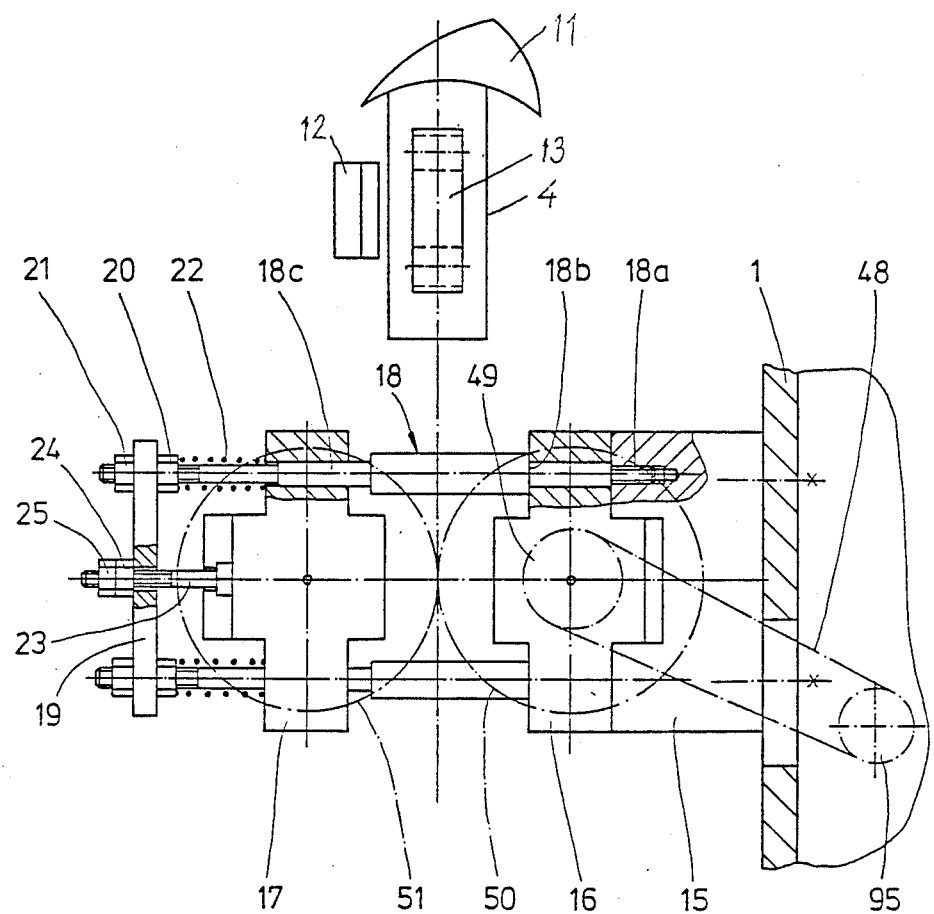
FIG. 2 is a partially vertically sectioned side view of the cross sealing station, the rotating parts of the cross sealing stations having been omitted for purposes of clarity.
Figure 3:
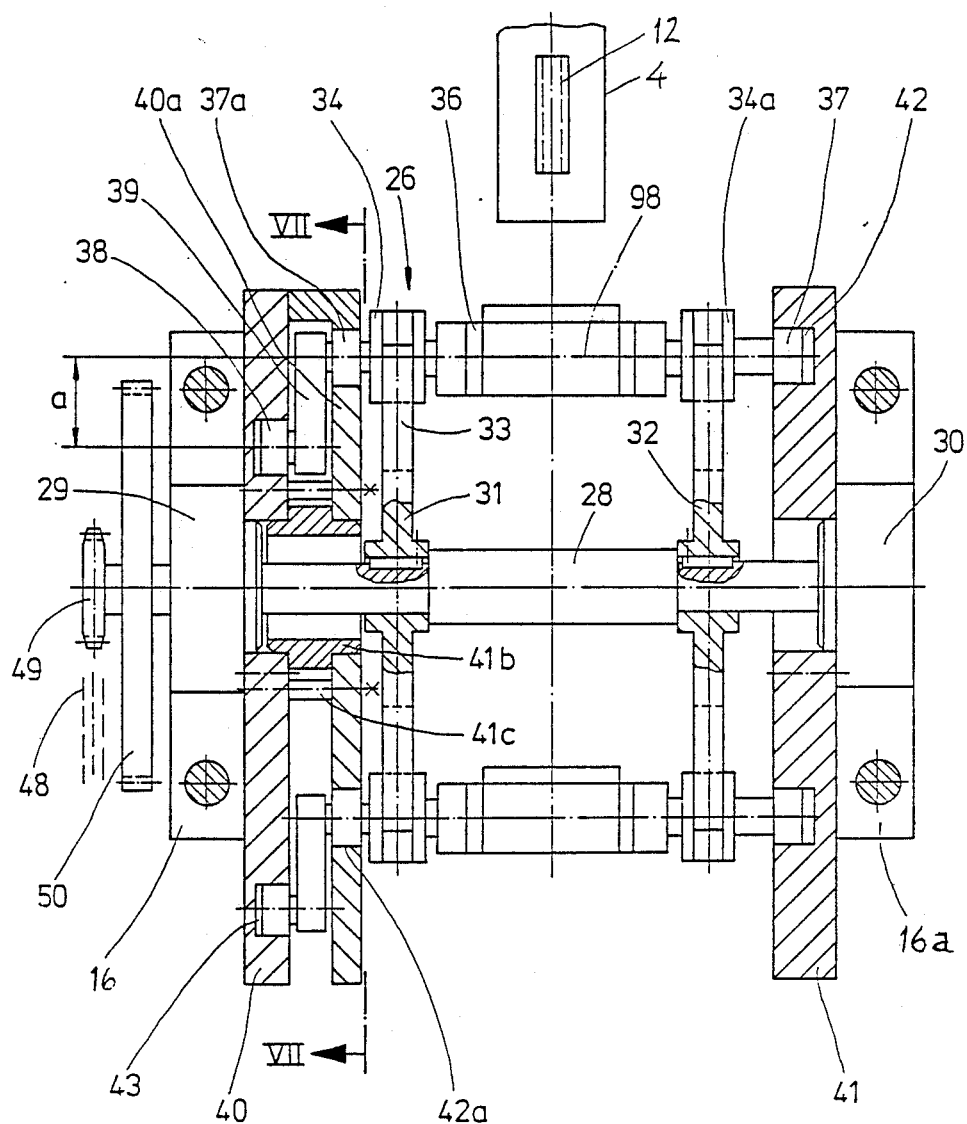
FIG. 3 is a vertical cross-sectional view of a sealing jaw carrier taken along the line III—III of FIG. 1.

Holding plates 15 are provided on the front side of the frame 1. Bearing plates 16, 17 are held on the holding plates (see also FIG. 2). A further bearing plate 16a, 17a is provided parallel to each bearing plate 16, 17. The further bearing plates 16a, 17a can be seen in FIG. 1. FIG. 3 shows the bearing plates 17, 17a forming a pair. The bearing plates 16, 16a form a further pair.

The bearing plates 16, 16a are rigidly secured by bolts to their associated holding plate 15. For this, bolts 18 are used, which are necked down several times and are screwed with a front threaded part 18a into the bearing plate 15 to cause the shoulder 18b to press the bearing plate 16 against the bearing plate 15. Each bolt 18 has a guide area 18c on which the bearing plate 17 (or 17a) is movable. Both bolts 18 are connected through a bridge member 19 fixed to the bolts 18 by means of nuts 20, 21.

By turning the nuts 20, 21, it is possible to change the location of the bridge 19. Each bolt 18 is surrounded by a compression spring 22, which urges the bearing plate 17 in direction of the bearing plate 16. The path of movement of the bearing plate 17 is defined by a tension bolt 23, on which can be screwed an adjusting nut 24 and a counter nut 25. Both the pressure of the springs 22 and also the stop or abutment position can be changed by the adjusting capabilities.

The cross sealing station has two sealing jaw carriers 26 and 27. The sealing jaw carriers 26, 27 are constructed alike and are described in connection with the example of the sealing jaw carrier 26 illustrated in FIG. 3.

The sealing jaw carrier 26 has a shaft 28, which is rotatably supported in bearings 29, 30. The bearings 29, 30 are held in the bearing plates 17, 17a. Cams 31, 32 are fixedly connected to the shaft 28. Each cam 31, 32 has diametrically opposed arms. One guide slot 33 is provided on each arm in which is received a slider 34. A roller bearing 35 is provided in each slider 34 (see FIG. 5). A sealing jaw holder 36 is supported rotatably in the roller bearing 35.

The sealing jaw holder 36 has two guide rollers 37 and 38 (see FIG. 3). The guide roller 37 is concentric with respect to the adjacent bearing within the slider 34a and thus also concentric with respect to the swivel axis 98 of the sealing jaw holder 36. The other guide roller 38 sits on a crank arm 39, which is rigidly connected to the sealing jaw holder 36. The axis of the guide roller 38 is spaced from the axis of the guide roller 37 which, as stated earlier, coincides with the swivel axis of the sealing jaw holder 36. This space is defined by the coordinates a, b (see also FIG. 7).

The sealing jaw holder 36 has a further guide roller 37a, which is coaxial with respect to the guide roller 37 and thus also concentrical with respect to the adjacent bearing within the slider 34.

A cam plate 40 is fixedly connected to the bearing plate 17 and a further cam plate 41 is fixedly connected to the bearing plate 17a. A guide groove 42, into which the guide roller 37 fittingly engages, is provided in the cam plate 41. A guide groove 43, into which the guide roller 38 fittingly engages, is also provided in the cam plate 40.

Figure 7:
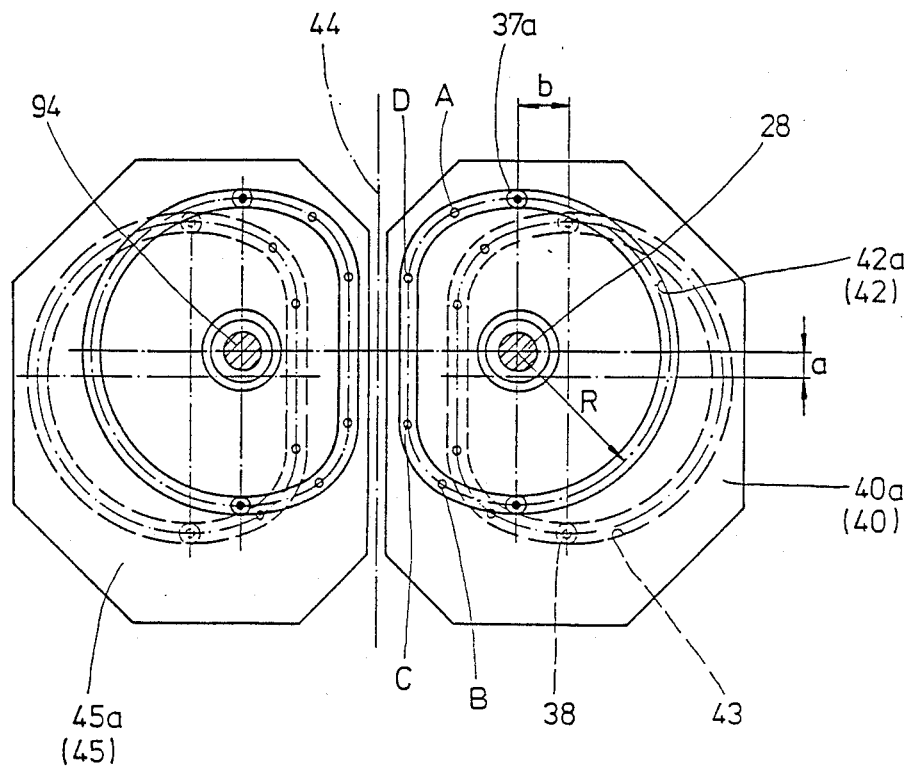
FIG. 7 illustrates guideways for the holders of cross sealing jaws taken along the line VII—VII of FIG. 3.

The guide grooves 42, 43 are endless and have the same shape as shown in FIG. 7. The guide groove 43 lying behind the drawing plane is moved parallel in vertical direction relative to the guide groove 42, namely for a distance which equals the distance between the axes of the guide rollers 37 and 38 (see also FIG. 3). The parallel movement is defined by the already mentioned coordinates a, b. The center distance between the guide rollers 37, 37a and 38 is thus $\sqrt{a^2+a^2}$.

A further guide groove 42a is provided concentrically with respect to the guide groove 42. The guide groove 42a is provided in a further cam plate 40a and is engaged by the guide rollers 37a. The guide grooves 42, 42a have the same function for controlling the rotary position of the sealing jaw holders 36. Therefore, the guide groove 42 could for example principally be left out. However, its presence significantly improves the stability of the movement mechanism and is particularly useful, when the sealing jaws are very long.

The dash-dotted line 44 is the cross center of the packaging machine. Further cam plates are arranged in a mirror image manner symmetrically to the plane defined by the dash-dotted line 44. One cam plate 45 is illustrated in FIG. 7. A cam plate, which is not illustrated in the drawing and which in FIG. 7 would lie in front of the drawing plane, lies in the same plane as the cam plate 40.

The shape of the guide grooves 42, 42a, 43 is as follows. FIG. 3 shows that the grooves have a rectangular cross section. The section A-B (see FIG. 7) is circular, whereby the center radius R of the circle has its centerpoint on the axis of the shaft 28. The sections B-C and D-A are curved transition sections, which can both be constructed alike and can differ from a circle. The selection C-D is a straight section. The guide rollers move during the sealing and cutting-off operation in said section.

The sealing jaw carriers 26 and 27 are driven in opposite directions, in direction of the arrows 46, 47 (see FIG. 1). The shaft 28 (see FIG. 3) is for this purpose driven through a drive chain 48 engaging a chain sprocket 49, which is fixedly connected to the shaft 28. A gear 50 is also fixedly connected to the shaft 28. The gear 50 is schematically illustrated by a dash-dotted line in FIG. 2. The gear 50 mates with a gear 51 of the same size, which is fixedly connected to the shaft of the other sealing jaw carrier.

Figure 5:
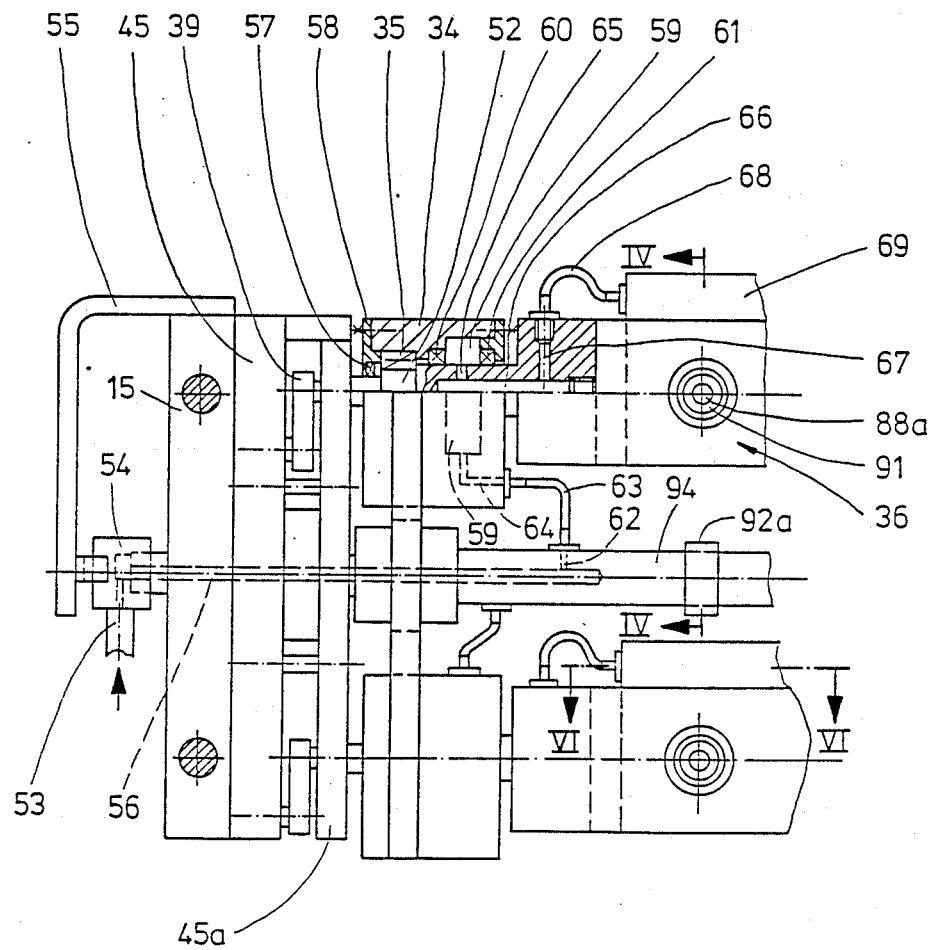
FIG. 5 is a partial illustration of a sealing jaw carrier illustrating the supply of cooling air to the cross sealing jaws.
Figure 6:
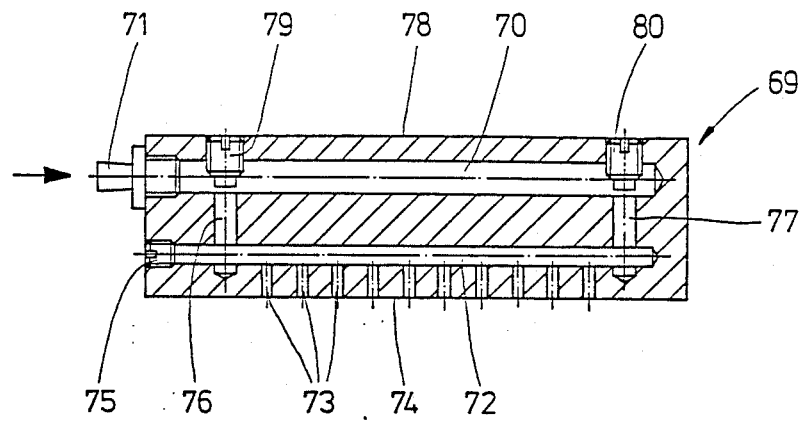
FIG. 6 is a longitudinal cross-sectional view of a cooling-air bar taken along the line VI—VI of FIG. 5.

The construction of the sealing jaw holder, the sealing jaws secured thereto and the construction of the cooling bars connected to the sealing jaws will be described hereinafter in connection with FIGS. 4 to 6.

Each sealing jaw holder 36 has journals 52, on which they are supported in the already mentioned roller bearings 35. Such a bearing is provided at each end of a sealing jaw holder 36. The supply of cooling air is also shown at the bearing end shown in FIG. 5.

The cooling air is supplied through a cooling-air pipeline 53 connected to a stationary rotary distributor 54. The rotary distributor sits on the outer ends of the shafts 28, 94 and is prevented from rotating by a bar 55 secured on a base plate 15. A longitudinal bore 56 communicating with the cooling-air pipeline 53 through the rotary distributor 54 is provided in each shaft 28, 94. The bearing 35 is sealed off against the outside by means of a shaft packing 57 sitting in a lid 58, which is screwed to the slider 34. The sealing jaw holder 36 is supported rotatably in the slider 34.

An annular air chamber 59 is provided in the slider 34. The air chamber 59 is closed off to the outside by means of shaft packings 60, 61. The air chamber 59 communicates with the cooling-air pipeline 56 in the shaft 28 through a transverse bore 62 in the shaft 94, a hose 63 connected to the transverse bore 62 and a bore 64 provided in the slider 34.

The air chamber 59 communicates through at least one bore 65 with a cavity 66 in the sealing jaw carrier 36. An air channel 67 starts out from the cavity 66. A hose 68 leading to a cooling-air bar 69 is connected to the air channel 67. The cooling-air bar 69 is illustrated in cross section in FIG. 6.

The cooling-air bar 69 contains a collecting chamber 70 in the form of a large-volume bore. The mentioned hose 68 is connected through a nozzle tip 71 to the collecting chamber. A distributor bore 72 extends parallel to the collecting chamber 70. Several nozzles 73 start out from the distributor bore 72. The nozzles 73 end at an outer surface 74 of the cooling-air bar 69. The distributor bore is closed off to the outside by a locking screw or plug 75. The distributor bore 72 is connected with its end areas through transverse bores 76, 77 to the collecting chamber 70. The transverse bores 76, 77 extend to one end surface 78 of the cooling-air bar and are there closed off by means of screws or plugs 79, 80. The screws or plugs 79, 80 are at the same time used as adjustable throttle elements. The deeper these screws are screwed in, the smaller becomes the cross section of the flow connection between the collecting chamber 70 and the transverse bores 76, 77. The amount of air flowing through can thus be adjusted at a given pressure and also the distribution to the individual nozzles can be regulated.

Figure 4:
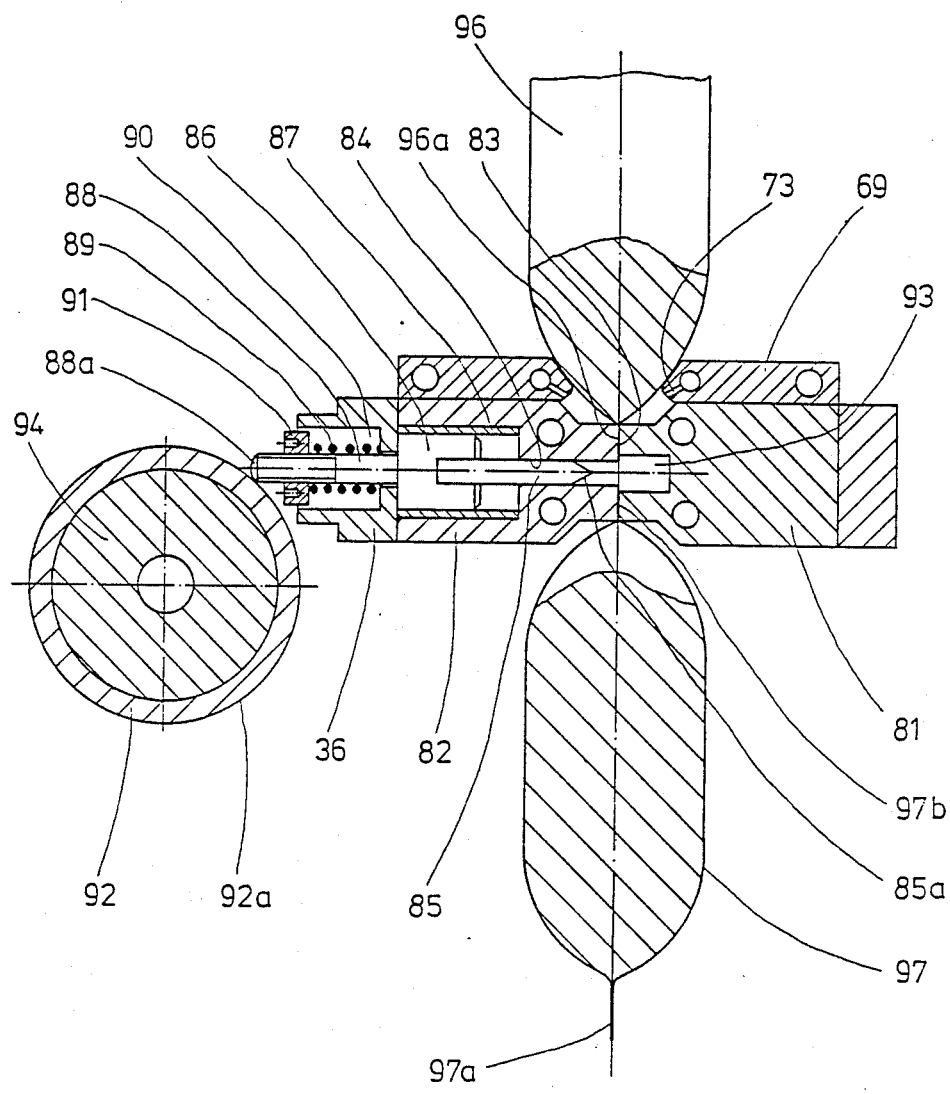
FIG. 4 is a cross-sectional view of cooperating cross sealing jaws which are in the sealing position taken along the line IV—IV of FIG. 5.

As shown in FIG. 4, the cooling-air bars 69 are mounted on the cross sealing jaws 81 or 82. The air nozzles 73 are oriented such that they direct air into the area of the sealing seam 83.

Cutting knives are provided on the cross sealing jaws 82 of a sealing jaw carrier. The cutting knives are in the illustrated case provided on the cross sealing jaws 82 of the sealing jaw carrier 26.

A guide slot 84 is provided in the sealing jaw 82. A knife 85 is slidably supported in the guide slot 84. The knife has an edge 85a. A pistonlike guide piece 86 is secured at the back of the knife 85. The guide piece 86 can slide in a sleeve 87, which is inserted into the cross sealing jaw 82. A rod 88 engaging the sealing jaw holder 36 is provided on the guide piece 86. The rod 88 is surrounded by a compression spring 89, which is supported with one end on the base of a recess 90 provided in the sealing jaw carrier 36, while the other end is supported on a nut 91 screwed onto a thread on the rod 88. The spring 89 is initially tensioned. Its initial tension can be regulated by screwing the nut 91 on more or less.

The rear end 88a of the rod 88 forms a scanning surface, which cooperates with a control surface 92a for example the cylindrical outer surface of a ring 92 mounted on the shaft 94.

A recess 93, into which the knife 85 can extend during a cutting operation, is provided in the oppositely lying cross sealing jaw 81. It can easily be seen in FIG. 4 that during a vertical downward movement of the cross sealing jaws 81, 82, the guide piece 86 is pressed to the left by overcoming the initial tension force of the spring 89, whereby the rod end 88a slides along the surface 92a. The spring 89 maintains the contact between the rod end 88a and the surface 92a and also effects the pressing back of the knife 85 into the shown rest position, after the control surface 92a has been passed. Two ramming tools 86, 88 can be provided in order to avoid a canting of a wide knife.

The packaging machine operates as follows. The simple case is assumed so that both the unwinding speed of the thin sheet material foil 4 and also the angular speed of the shafts 28 and 94 are constant. These speeds are in a specific relationship with one another, which relationship corresponds with the desired bag length. If long bags are to be manufactured, the unwinding speed for the foil tube 4 is relatively high. In case shorter bags are to be manufactured, the unwinding speed is relatively small in relationship to the angular speed of the shafts 28, 94. The relationship can be changed as desired. A gearlike connection between the drive shafts 14 for the unwinding belts and the chain sprocket 95, from where the two sealing jaw holders 26, 27 are driven in opposite directions by the chain sprocket 95, exists for this purpose.

The engagement of each sealing jaw holder 36 in two guide grooves 42, 43 which are laterally offset and parallel to one another causes the sealing jaw holders to maintain a horizontal position during their entire travel over the entire circumference of the grooves. The two travelling cross sealing jaws 81, 82 approach the tubular foil inclined from above and, after moving through the transition areas A–D with the foil tube in the position illustrated in FIGS. 1 and 4, in which position the cross sealing jaws 81, 82 press the two thin sheet material layers against one another, seal same to one another using heat. An upper bag 96 still to be filled is in this manner provided with a bottom seam 96a, while a lower, already filled bag 97 is provided with a top seam 97b. The bottom seam 97a was formed already during a preceding operating cycle. Filler can be supplied immediately after clamping the thin sheet material layers together with the cross sealing jaws 81, 82.

The lower bag 97 is separated by means of the knife 85, which is moved to the right (FIG. 4) by running onto the control surface 92a during the course of the downward movement of the travelling cross sealing jaws 81, 82. The separation can already occur in the initial stage of the downward movement of the cross sealing jaws 81, 82, since the lower bag 97 cannot fall off, not even after the separation, because of the bag being clamped by the cross sealing jaws 81, 82.

Passage through the cross sealing and cutting-off station occurs, when the guide rollers 37 have arrived at point C. The cross sealing jaws now move away from one another, which causes the lower bag 97 to be freed and to fall downwardly.

After the cross sealing jaws 81, 82 have moved away from the seam, the next following bag has already been filled and the diametrically opposed cross sealing jaws 81a, 82a have already substantially approached the foil tube 4. Soon after the cross sealing jaws 81, 82 have released their engagement, the jaws 81a and 82a come into contact with the foil tube, after which the described cycle starts over again.

FIG. 7 shows best that between the points D and C, at a constant angular speed of the shafts 28, 94, the downward speed of the travelling cross sealing jaws is first reduced, since the distance from the center of rotation is first reduced, and then again increased because of an increase of the distance from the center of rotation. This variation in speed can, however, as a rule be tolerated, since the filling of the bag rounds same out, so that compressions in the foil tube do not occur. However, it is possible to exactly adjust the speed of movement of the cross sealing jaws to the unwinding speed of the foil tube 4. Three possibilities exist for this. The first possibility is that the angular speed of the shafts 28, 94 between the path points D and C is first increased and then again reduced. The second possibility is that by changing the angular speed of the drive shafts 14, the unwinding belt 13 initially slows down the unwinding speed and then again increases same. The third possibility is that both the angular speed of the shafts 28, 94 within the cross sealing zone and also the unwinding speed of the foil tube 4 is changed. Such adjustments can occur using conventional means, whereby the man skilled in the art has both purely mechanical and also electronic solutions available for this.

The transition areas A-C and C-B of the control grooves 42, 43 can be optimized in view of accelerations which are as slow as possible, so that the mass forces due to inertia are maintained low.

It is necessary for changing the bag length to change the peripheral speed of the unwinding belts 13 in relationship to the rotary speed of the sealing jaw carriers 26, 27. A gear connection 103 is provided for this purpose between the drive 101 for the sealing jaw carriers 26, 27 and a drive shaft 102 for the unwinding belts 13. The gear connection is only schematically illustrated by a dash-dotted line in the drawings. The gear connection 103 permits the changing of the speed ratio between the sealing jaw carriers 26, 27 and the shaft 102. In place of a mechanical gear connection, it is also possible to provide an electric shaft, for example also one with a stepping motor. Aside from these possibilities, any known method can be used, with which the speed ratio between two shafts can be changed. Simultaneously with the mentioned change of the speed ratio, the drive 101 can be adjusted so that the angular speed of the sealing jaw carriers becomes irregular in order to cause the speed of movement of the sealing jaws 81, 82 in the area D-C (see FIG. 7) to be adjusted to the speed of movement of the foil tube.

The embodiments of the invention in which an exclusive property or privilege is claimed are defined as follows:

1. In a packaging machine for manufacturing bags from a thin foil of a hot-sealable material and for filling and closing said bags, comprising a vertically extending mandrel means surrounded by a shoulder means for forming said thin foil into a tube having overlapping edges, a longitudinal sealing member for connecting said overlapping edges of said thin foil, and a sealing station arranged downstream of an output end of said mandrel means and having sealing jaws arranged in opposition to each other on two travelling jaw carriers which are synchronously movable about parallel axes in opposite senses of direction, each sealing jaw being supported by a jaw holder which is adapted to pivot about a pivot axis relative to an associated jaw carrier, the improvement wherein continuously moving conveyor means are provided for engaging said foil below said shoulder means with positive friction to facilitate an unwinding of said thin foil and movement over said mandrel means, wherein speed adjusting means are provided for governing the relationship between the peripheral speeds of said conveyor means and of said jaw carriers such that the speed of movement of said sealing jaws during continued contact with said foil tube will not exceed the peripheral speed of said conveyor means, wherein said jaw holders are radially movable in said jaw carriers, wherein each jaw holder has two guide elements, each of which is guided on a closed guideway of a symmetrical and concentric pair of guideways, said pair of symmetrical and concentric guideways having identical shapes, wherein said sealing jaws are oriented perpendicularly with respect to said foil tube at least in the area of a vertically extending sealing zone along which said sealing jaws move face to face downward with said thin foil tube pinched therebetween, and wherein a third guideway is provided which is concentric to one of said pair of symmetrical guideways, said symmetrical and concentric guideways being each oriented at opposite sides of said jaw holders.

2. The packaging machine according to claim 1, wherein means are provided for facilitating movement of at least one of said parallel axes toward and away from the other of said parallel axes.

3. The packaging machine according to claim 1, wherein said parallel axes are stationary.

4. The packaging machine according to claim 1, wherein each jaw carrier has a shaft to which two guide parts are attached for rotation therewith, said jaw holders extending between said two guide parts.

5. The packaging machine according to claim 1, wherein said jaw holders are provided with journals which engage sliders that are movable in said holders.

6. The packaging machine according to claim 1, wherein said guideways are grooves positively engaged by said guide elements on said jaw holders.

7. The packaging machine according to claim 6, wherein said guide elements are rollers.

8. The packaging machine according to claim 1, wherein one guide element is concentric to said pivot axis of said associated jaw holder, and wherein the other guide element is arranged on a crank arm projecting from said pivot axis.

9. The packaging machine according to claim 8, wherein each guideway has a circular section (A-B) extending over at least 180 degrees and being concentric to the axis of rotation of said associated jaw carrier, and wherein said circular section (A-B) is continued by curved transition sections (A-D, B-C) and by a straight sealing zone (D-C) which latter is parallel to an unwinding direction of said thin foil.

10. The packaging machine according to claim 1, wherein on each jaw carrier, there are two sealing jaws arranged diametrically to one another.

11. The packaging machine according to claim 1, wherein each guideway has a circular section (A-B) extending over at least 180 degrees, and wherein said circular section (A-B) is continued by curved transition sections (A-D, B-C) and by a straight sealing zone (D-C) which latter is parallel to an unwinding direction of said thin foil.

12. The packaging machine according to claim 1, wherein said jaw carriers are spring-biassed relative to one another such that they can be forced apart once an initial tension is overcome.

13. The packaging machine according to claim 12, wherein one of said jaw carriers is stationary and the other one is slidable and is pressed towards said one jaw carrier by spring means, the path of said movable jaw carrier being limited by an adjustable stop.

14. The packaging machine according to claim 1, wherein for cutting off filled and closed bags, said sealing jaws of a jaw carrier include a knife activated by at least one ramming tool coacting with a convex cylindrical surface which is provided on a shaft of said jaw carrier.

15. The packaging machine according to claim 14, wherein said ramming tool is loaded by a return spring and adjusting means for adjusting the initial tension of said return spring.

16. The packaging machine according to claim 1, wherein for cooling a sealing seam, air nozzles are provided on at least one sealing jaw of a cooperating pair of said sealing jaws, wherein a shaft of at least one jaw carrier contains a cooling-air channel communicating through a flexible line with an annular channel which is provided in a slider, and wherein said annular channel communicates through at least one cross bore with a cavity within one jaw holder, which cavity in turn is line-connected to another cavity joined to said air nozzles.

17. The packaging machine according to claim 16, wherein on said sealing jaws, an air distributor is provided having a large-volume air collecting chamber from where cross bores extend to a distributor channel joined to said air nozzles, and wherein said cross bores extend to the outside of the air distributor and are adapted to receive screw plugs for adjusting the flow cross section between said air collecting chamber and said cross bores.

18. The packaging machine according to claim 1, wherein for obtaining equal speeds of the thin foil and of the sealing jaws in the sealing zone (D-C), the ratio between an unwinding speed of said thin foil and an angular speed of said jaw carriers is variable during one rotation of said jaw carriers.

19. The packaging machine according to claim 18, wherein said unwinding speed of said thin foil is constant and said angular speed of said jaw carriers is variable.

20. The packaging machine according to claim 19, wherein said angular speed of said jaw carriers increases towards approximately the center of a sealing zone (D-C) and decreases again therebehind.

21. In a method for operating a packaging machine for manufacturing bags from a thin foil of a hot-sealable material and for filling and closing said bags, comprising a vertically extending mandrel means surrounded by a shoulder means for forming said thin foil into a tube having overlapping edges, a longitudinal sealing member for connecting said overlapping edges of said thin foil, and a sealing station arranged downstream of an output end of said mandrel means and having sealing jaws arranged in opposition to each other on two travelling jaw carriers which are synchronously movable about parallel axes in opposite senses of direction, each sealing jaw being supported by a jaw holder which is adapted to pivot about a pivot axis relative to an associated jaw carrier, the improvement wherein a continuous movement of a conveyor means is implemented, said conveyor means engaging said foil below said shoulder means with positive friction to facilitate a continuous unwinding of said thin foil and movement over said mandrel means, and wherein a governing of a speed adjusting means is also implemented for controlling the relationship between the peripheral speeds of said conveyor means and of said jaw carriers so that the speed of movement of said sealing jaws during continued contact with said foil tube will not exceed the peripheral speed of said conveyor means and so that said thin foil is pulled off from said mandrel at a speed that is slightly slower than a speed of movement of the material to be packaged relative to a lower end of said mandrel means.

22. The method according to claim 21, wherein an unwinding speed of said thin foil is slower by about 1 percent to 20 percent of said speed of movement of the material to be packaged.

* * * * *